Oct. 24, 1967 R. W. FORSYTH ETAL 3,348,518
AMPHIBIOUS STAR-WHEELED VEHICLE
Filed Oct. 13, 1965 3 Sheets-Sheet 1
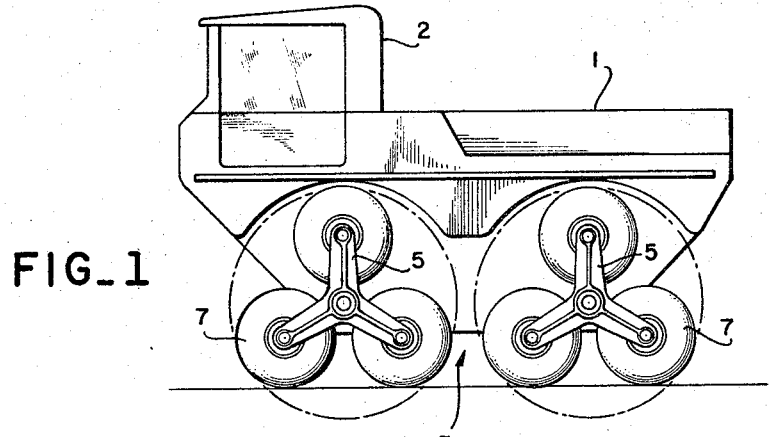
FIG_1
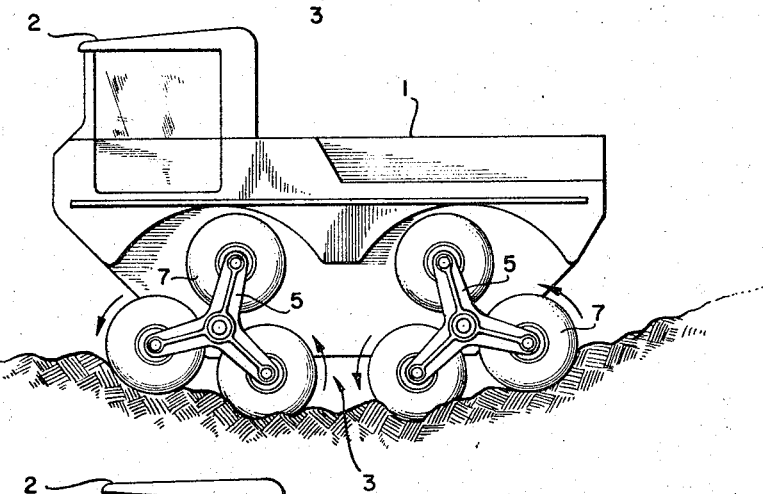
FIG_4
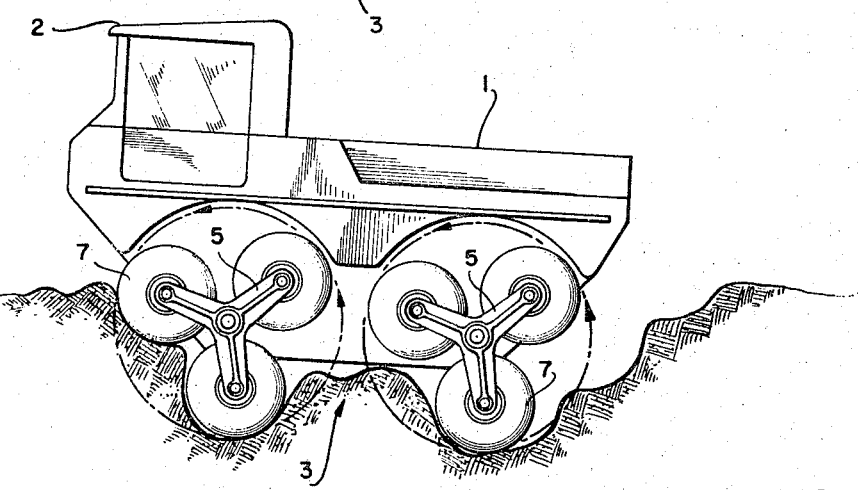
FIG_5
INVENTORS
ROBERT W. FORSYTH
JOHN P. FORSYTH
BY *George C. Sullivan*
Agent Oct. 24, 1967   R. W. FORSYTH ETAL   3,348,518
AMPHIBIOUS STAR-WHEELED VEHICLE
Filed Oct. 13, 1965   3 Sheets-Sheet 2
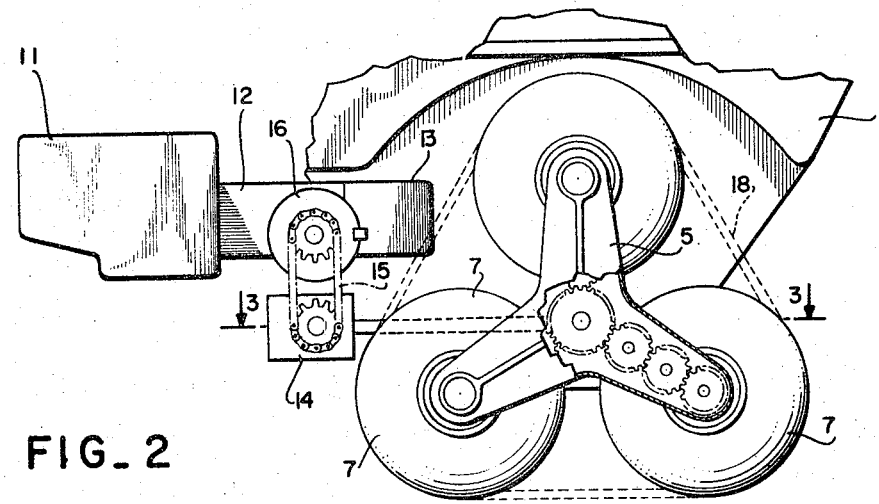
FIG_2
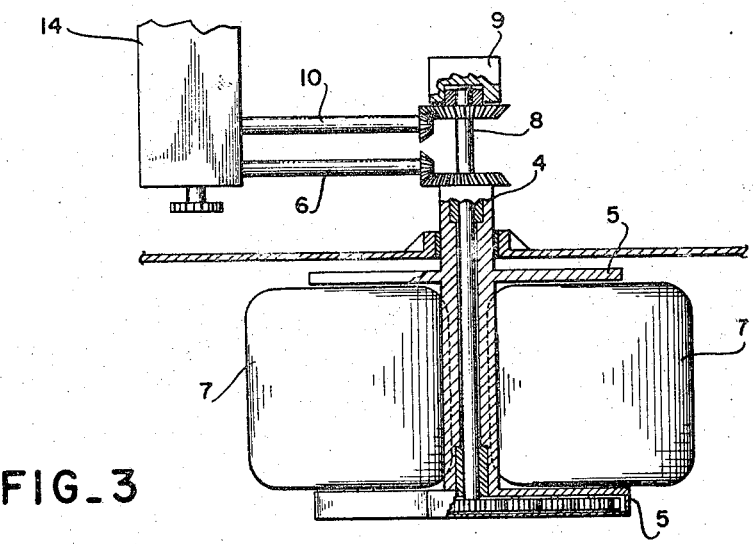
FIG_3
INVENTORS
ROBERT W. FORSYTH
JOHN P. FORSYTH
BY George C. Sullivan
Agent

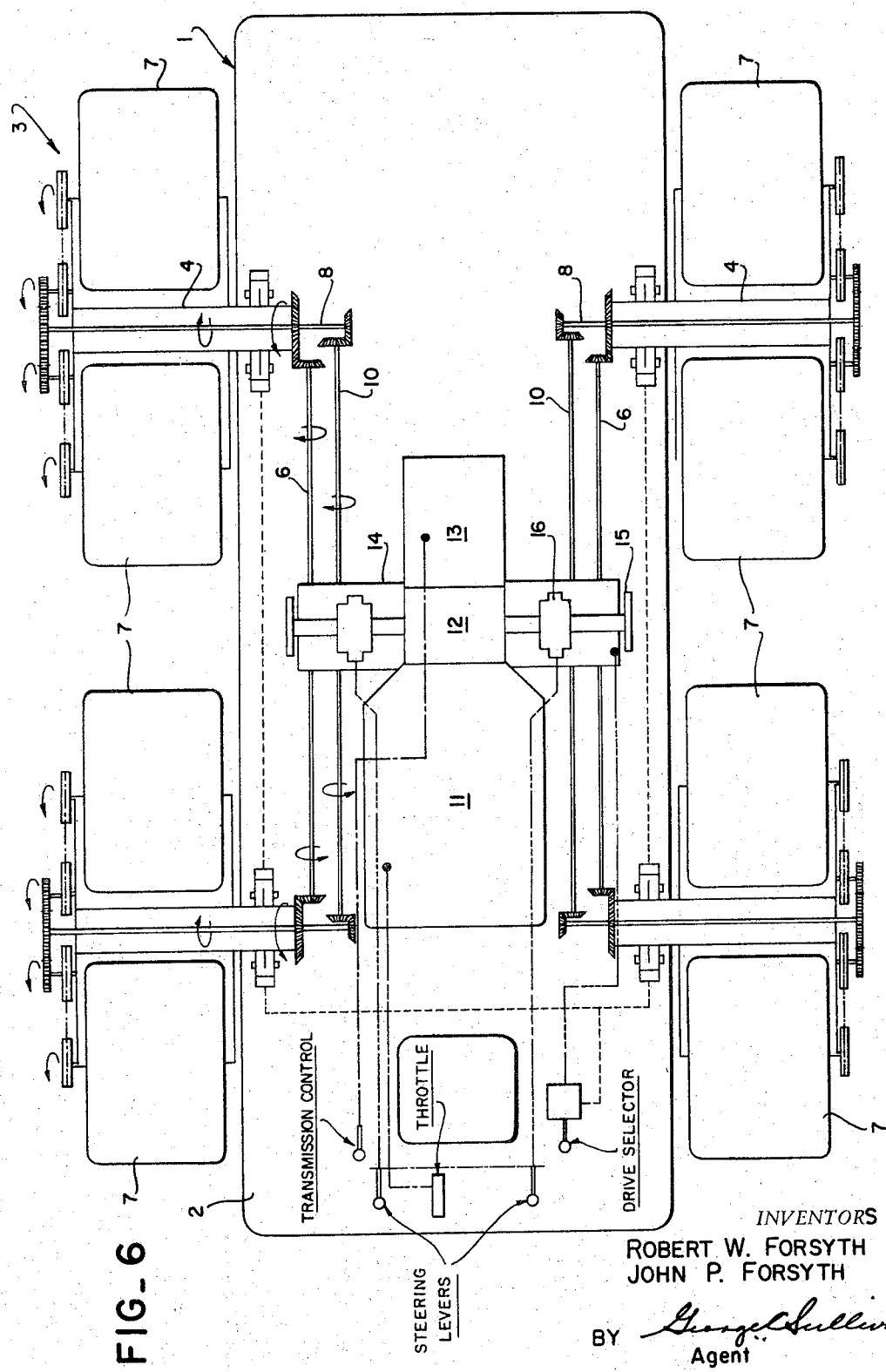

3,348,518
AMPHIBIOUS STAR-WHEELED VEHICLE
Robert W. Forsyth and John P. Forsyth, Upland, Calif., assignors to Lockheed Aircraft Corporation, Burbank, Calif.
Filed Oct. 13, 1965, Ser. No. 495,443
6 Claims. (Cl. 115—1)

ABSTRACT OF THE DISCLOSURE

A multi-purpose vehicle having a plurality of low-pressure, low-profile, wide-base tires mounted for rotation on individual axles which are spaced from and rotatable as an assembly about a central axis. The assembly and/or the individual wheels may be selectively driven to provide locomotion over surfaces of varying plasticity, such as hard surfaced roads, mud, swamps and open water.

This invention relates to vehicles and more particularly to a multiple-purpose vehicle having equally high performance on the road and off the road.

Presently-known vehicles are very restricted with respect to performing satisfactorily over more than one operational environment. Existing wheeled vehicles operate with maximum efficiency on roads and highways but suffer a performance loss traveling off the road and are prone to immobilization in soft soils. Tracked vehicles perform well in most of the terrain conditions encountered off the road, have acceptable to marginal capabilities in soft soils depending on the track configuration, but fall short of wheeled vehicle performance on roads and highways from the standpoints of efficiency and accelerated track wear at higher speeds. Other highly-specialized vehicles designed primarily for superior performance in soft soils generally have little ability to travel on roads and highways, and involve the use of transporters for movements of any distance. The principal obstacle to achieving what might be termed "universal mobility"—the ability to perform equally well over more than one operating environment—with a single vehicle has been incorporating a capability for high performance in severe soft soil conditions. The movement of wheeled and tracked vehicles through instable plastic, soft soils is generally not possible without substantial sinkage and slip. The resulting deformation of the material causes high motion resistance and slip losses, degrading the efficiency of the vehicle and making it prone to immobilization. The design steps which have customarily been taken to mitigate this condition have been in direct contradiction of those steps which are necessary to assure high performance on roads and highways. A more satisfactory solution could be realized by designing for efficient operation on improved surfaces—roads and highways—by providing for wheeled locomotion in that environment and incorporating a full capability for high performance in severe soft soil conditions by employing a method of locomotion—utilizing the wheeled running gear—which would result in performance equal to or better than that of a tracked running gear.

It is therefore a primary object of this invention to provide a vehicle having equally high performance when operated on roads and highways, irregular hard ground, and in soft soils and, particularly, a vehicle in which the running gear components employed for locomotion on improved surfaces—roads and highways—and hard, irregular ground are powered and operated in a different manner to provide locomotion in severe soft soil conditions.

Another object of the invention is to provide an amphibious vehicle having high efficiency in the water derived from a "paddle wheel" type of propulsion. A further object of the invention is to provide a wheeled vehicle which is capable of a "walking" method of locomotion.

These and other objects of the invention will be apparent from the following description taken in connection with the drawings wherein:

FIG. 1 is a side view of a vehicle embodying the invention;

FIG. 2 is a side view of the wheel assembly in accordance with the invention;

FIG. 3 is a plan view taken substantially on line 3—3 and partly in section for clarity;

FIGS. 4 and 5 are additional side views of the vehicle illustrating operation of the vehicle.

FIG. 6 is a schematic of a typical power train and control system.

With reference to FIG. 1, a typical two-axle vehicle, having body section 1 and a driver's position 2, is provided with running gear 3, the details of which are shown in FIGS. 2 and 3. Inasmuch as all wheel assemblies are similar, only one will be described.

A tubular axle 4 is supported in the vehicle hull by suitable bearings. A three-spoke hub or spider assembly 5 is rigidly attached to the tubular axle. As best seen in FIG. 3, one three-spoke hub is attached at the outer end of the tubular axle, and another hub is attached to the axle adjacent the vehicle hull. This assembly which will be referred to hereinafter as the major wheel assembly is rotated by the major wheel drive shaft 6.

A wheel and low pressure, low-profile wide tread tire assembly 7 is mounted between the ends of each pair of spokes 5, and will be referred to as the minor wheels. Shaft 8 is concentrically supported within the tubular axle and drives the individual minor wheels through suitable gear trains, chain drives or the like. The inner end of shaft 8 is supported in the bearing housing 9. Minor wheel drive shaft 10 rotates the shaft 8 as indicated. If desired a track as indicated in broken lines 18 may be utilized in lieu of the wheel and tire assembly.

The engine 11, differential 12, and transmission 13 are conventional and a detail description is believed unnecessary. Skid-steering brake units 16 are mounted on the differential-transmission housing with the differential output shafts passing therethrough to couple power to a transfer case 14 such as by a chain drive 15. For further details of skid-steering, i.e., differential steering, reference may be had to AMCP 706–355, "The Automotive Assembly," an engineer's handbook published by the Army Materiel Command and dated Dec. 31, 1962. The transfer case provides for selective application of driving torque to drive shaft 6 and 10 at all four-wheel assemblies. Standard controls are located conveniently to the driver's position for the engine, transmission and transfer case as illustrated in FIG. 6. Steering controls in the form of the usual braking units for skid steering are similarly located.

By way of illustration only, FIG. 6 shows a typical power train and control system which may be utilized with the invention. It is expressly understood, of course, that where a different motive power or steering is utilized the schematic would be accordingly modified. The arrows indicate direction of rotation of drive shafts and wheels when the vehicle is operated in a forward direction either on the minor wheels or on the major wheels.

Referring to FIGS. 1, 4 and 5, the various surfaces are typically illustrated.

For operation on roads and highways, i.e., hard smooth surfaces such as depicted in FIG. 1, the major wheel assemblies are substantially locked in the position illustrated with preferably two of the three minor wheels of each assembly bearing on the surface. In this case only the minor wheels are driven.

For operation on hard, irregular surfaces such as illustrated in FIG. 4, only the minor wheels are driven. However, the mechanisms which prevent rotation of the major wheel assemblies provide a snubbing action which limits oscillation of the major wheel assemblies about the axes of their shafts, thereby providing a suspension system for the minor wheels in contact with the irregular surface. This snubbing action generally designated at 17 in FIG. 6 may be accomplished by mechanical limits, hydro-pneumatic or torsion systems such as mechanical stops or rubber bumpers, shock absorbers, or torsion bars or equivalents.

For operation in soft plastic soils, such as mud, marsh, swamp, and the like, the major wheel assemblies are driven as in FIG. 5, and their rotation provides a "walking" motion as the minor wheels of the assemblies are successively brought into contact with and then separated from the soil. It is also contemplated that, where a traction advantage may be gained, the minor wheels may be driven at the same or a lesser r.p.m. while the major wheel assemblies are being rotated.

For operation in water the major wheel assemblies are driven as in FIG. 5 and their rotation provides a "paddlewheel" type of propulsion for the vehicle.

It is believed apparent that the invention is not restricted to the particular configuration shown. For example, the running gear as described may be applied to other types of vehicles. Likewise, it is not deemed to be necessary that all axles incorporate running gear according to the invention. For instance, the vehicle may incorporate one or more major wheel assembly axles and other axle(s) carrying conventional wheels and tires, the latter being utilized with an Ackerman steering arrangement. Furthermore, while three minor wheels per major wheel assembly is preferable, it is apparent that a "walking" or "paddle wheel" action exists with additional minor wheels.

Thus, while specific embodiments of the invention have been shown and described, it should be understood that certain alterations, modifications and substitutions may be made to the instant disclosure without departing from the spirit and scope of the invention as defined by the appended claims.

What is claimed is:

1. A multi-purpose vehicle comprising at least one body section, a plurality of major wheel assembly axles rotatably attached to said body section, a plurality of minor wheel assembly axles rotatably attached to said major wheel assembly axles, said minor wheel axles being parallel to and spaced from said major wheel axles and positioned substantially equidistant therearound, a wheel with low-pressure, low-profile, wide tread tire assembly mounted on said minor wheel axles and means for selectively driving said major and minor wheel assembly axles.

2. A vehicle as defined in claim 1, wherein said plurality of major wheel assembly axles consists of at least a pair of the recited assemblies.

3. A vehicle as defined in claim 1, wherein said minor wheel assembly axles are mounted at the ends a plurality of spokes extending radially from and rigidly attached to said major wheel assembly axles.

4. A vehicle as defined in claim 2, wherein said pair of assemblies constitutes effectively a single vehicle axle and is located at one end of said vehicle.

5. A running gear for a vehicle comprising a major wheel assembly consisting of a major wheel axle, a plurality of pairs of spokes extending radially from and spaced at equal angles around said axle, means for driving said major axle; a plurality of minor wheel assemblies consisting of a plurality of minor axles mounted between each pair of spokes, a wheel mounted on each minor axle, low-pressure, low-profile, wide tread tires mounted on said minor wheels, means for driving said minor wheels; and drive selector means for selectively applying power to said driving means.

6. A running gear for a vehicle as defined in claim 5 wherein said ground engaging means comprises at least two of said minor wheels for each major assembly.

References Cited
UNITED STATES PATENTS

| | | | |
|---|---|---|---|
| 2,400,824 | 5/1946 | Jackson | 180—8 |
| 2,742,973 | 4/1956 | Johannesen | 180—8 |
| 3,208,544 | 9/1965 | Colvin | 180—51 |
| 3,241,848 | 3/1966 | Flory | 280—5.26 |
| 3,283,839 | 11/1966 | Brown et al. | 180—8 |

LEO FRIAGLIA, *Primary Examiner.*